United States Patent [19]

Journee et al.

[11] Patent Number: 5,090,086
[45] Date of Patent: Feb. 25, 1992

[54] PIVOTING DEVICE FOR CONNECTING TWO OSCILLATING ELEMENTS OF A WINDSHIELD WIPER BLADE

[75] Inventors: Maurice Journee, Reilly; Jean Duda, Villeneuve-les-Sablons; Pierre Beneteau, Gorcy; Jean-Raymond Bru, Beauvais, all of France

[73] Assignee: Paul Journee S.A., Colombes Cedex, France

[21] Appl. No.: 597,359

[22] Filed: Oct. 10, 1990

[30] Foreign Application Priority Data

Oct. 13, 1989 [FR] France .................. 89 13431

[51] Int. Cl.5 ............................................. B60S 1/04
[52] U.S. Cl. ...................... 15/250.42; 15/250.31; 403/79
[58] Field of Search ........... 15/250.42, 250.32, 250.31, 15/250.35, 250.36; 403/79, 159, 163

[56] References Cited

U.S. PATENT DOCUMENTS

| | | | |
|---|---|---|---|
| 2,305,562 | 12/1942 | Thompson et al. | 403/159 |
| 3,408,679 | 11/1968 | Deutscher et al. | 15/250.42 |
| 3,416,180 | 12/1968 | Deutscher et al. | 15/250.32 |
| 3,757,377 | 9/1973 | Hayhurst | 15/250.32 |
| 4,014,066 | 3/1977 | Harbison et al. | 15/250.42 |
| 4,103,386 | 8/1978 | Arndt | 15/250.42 |
| 4,120,069 | 10/1978 | Sharp et al. | 15/250.32 |
| 4,137,598 | 2/1979 | Sharp | 15/250.42 |
| 4,180,885 | 1/1980 | Thornton et al. | 15/250.42 |
| 4,286,351 | 9/1981 | Mower et al. | 15/250.42 |
| 4,418,441 | 12/1983 | van der Berg | 15/250.42 |
| 4,675,934 | 6/1987 | Dol Palu | 15/250.42 |

FOREIGN PATENT DOCUMENTS

| | | | |
|---|---|---|---|
| 0005656 | 11/1979 | European Pat. Off. | |
| 0240357 | 10/1987 | European Pat. Off. | |
| 1505441 | 6/1973 | Fed. Rep. of Germany | 15/250.42 |
| 2851972 | 6/1980 | Fed. Rep. of Germany | 15/250.42 |
| 0608994 | 2/1979 | Switzerland | 15/250.42 |
| 2038167 | 7/1980 | United Kingdom | 15/250.42 |
| 2041730 | 9/1980 | United Kingdom | 15/250.42 |
| 2168600 | 6/1986 | United Kingdom | 15/250.42 |
| 2197023 | 5/1988 | United Kingdom | 15/250.35 |
| 2202899 | 10/1988 | United Kingdom | |

Primary Examiner—Harvey C. Hornsby
Assistant Examiner—Gary K. Graham
Attorney, Agent, or Firm—Dennison, Meserole, Pollack & Scheiner

[57] ABSTRACT

A pivoting connection device between two oscillating elements of a windshield wiper blade comprises an intermediate member carried by the main stirrup of the blade, with the intermediate member cooperating pivotally with a support bar. The latter has a resiliently deformable portion for engagement with a pivot means carried by the intermediate member. The invention is applicable in particular to automotive vehicles.

8 Claims, 1 Drawing Sheet

PIVOTING DEVICE FOR CONNECTING TWO OSCILLATING ELEMENTS OF A WINDSHIELD WIPER BLADE

FIELD OF THE INVENTION

This invention relates to windshield wiper blades, in particular for automotive vehicles, having two oscillating elements pivotally connected by means of a pivoting connection device.

BACKGROUND OF THE INVENTION

In current practice, a windshield wiper blade comprises a mounting for carrying a wiping strip, this mounting comprising a main stirrup, having a cross sectional profile which is generally in the shape of an inverted U-shaped channel and which is pivoted on a windshield wiper arm; together with at least one support bar which is interposed between the main stirrup and the wiping strip. This support bar is usually pivoted to one of the ends of the main stirrup through an intermediate member which is held in a fixed position by the main stirrup and within the channel defined by the latter.

Such an intermediate member, as is best described in, for example, the European patent specification No. 240 357 published on Oct. 7, 1987, is generally made from synthetic material, and is interposed between the main stirrup and the support bar in such a way as to prevent any contact between these two members such as to generate noise.

The intermediate member also includes a pivot means which enables limited rotation of the support bar to take place with respect to the main stirrup. However, although it has given some satisfaction, such an intermediate member does have the disadvantage of being somewhat complex.

Within the U-shaped channel defined by the intermediate member, articulating means for the support bar are provided which comprise two flexible tabs projecting from the inner surface of the central web or back of the U-shaped channel. Each of these flexible tabs is provided at its free end with a protuberance which projects in the form of a beak, and these flexible tabs are arranged to fit with a snap fit into two openings which are provided in the back portion of the support bar.

These flexible tabs have two effects. Firstly they limit the flexing of the wings of the U-shaped channel of the intermediate member towards each other when the latter is being fitted within an opening provided on the back of the stirrup: such flexing is necessary to enable the lower part of the wings, which are provided with projections for holding the intermediate member still, to be introduced. Secondly, the flexible tabs involve some complexity in the fitting of the support bar on to the intermediate member, since it is necessary to arrange the openings provided for this purpose on the support bar very accurately in relation to the tabs. In the event of faulty manipulation, the tabs may become cracked or may break, resulting in eventual malfunctioning of the wiper.

DISCUSSION OF THE INVENTION

The present invention aims to overcome the drawbacks mentioned above, by proposing a pivoting connection device which is very simple and which allows very easy fitting to the support bar.

In accordance with the invention, in a pivoting connection device for connecting two oscillating elements of a windshield wiper blade, the said connection device comprises an intermediate member carried by one of the said elements, referred to as a carrying element and cooperating pivotally with the other one of the said elements, referred to as the pivoted element, is characterised in that the pivoted element has at least one resiliently deformable portion carrying a pivot element for engagement with a pivot means carried by the intermediate member.

The invention enables the assembly between the oscillating pivoted element and the oscillating carrier element to be carried out in a simple manner without risk of damaging the intermediate member, the latter being generally of plastics material and carried by the carrier element.

The other features and advantages of the invention will appear from the description which follows, which is given by way of example only and with reference to the accompanying drawings.

DESCRIPTION OF A PREFERRED EMBODIMENT OF THE INVENTION

Figure 1:
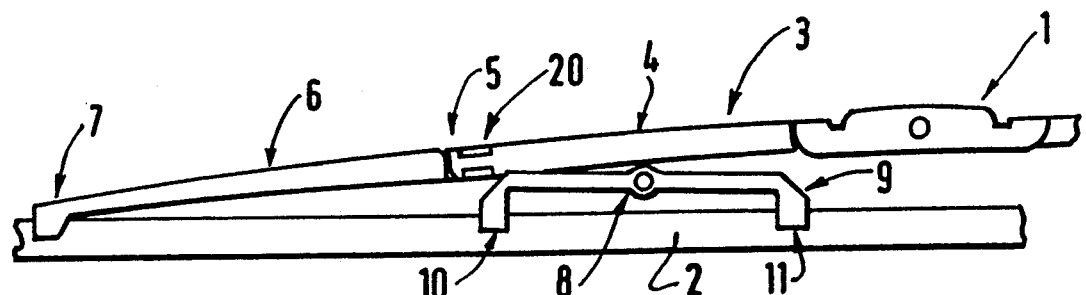
FIG. 1 is a partial view of a windshield wiper blade carrying a pivoting connection device in accordance with the invention.

Referring more particularly to FIG. 1, the windshield wiper blade 1 includes a wiping strip 2 carried by an armature 3. The armature 3 generally comprises a channel-shaped main stirrup 4, having a general cross section in the form of an inverted U, and adapted to carry pivotally at one of its ends 5 a support bar 6 which, as shown in FIG. 1, is connected at one of its ends 7 to the wiping strip 2. At its other end 8 it also carries pivotally an auxiliary support bar 9, the ends 10 and 11 of which are connected to the wiping strip 2.

Figure 2:
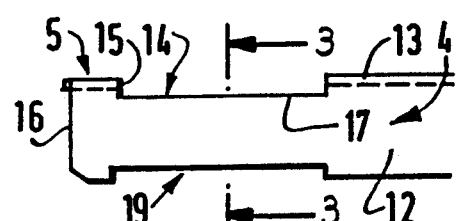
FIG. 2 is a view showing one element of the pivoting connection device in accordance with the invention.
Figure 9:
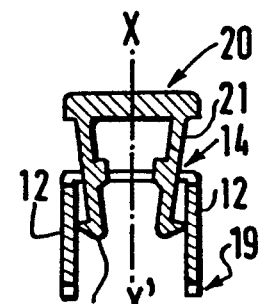
FIGS. 9 to 12 show the different stages in the fitting of the various elements in order to produce the pivoting connection device in accordance with the invention.
Figure 3:
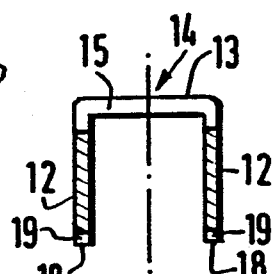
FIG. 3 is a view in cross section taken on the line 3—3 in FIG. 2.

In the rest of this description, in the interests of clarity, these various connections will be mentioned only as the "pivoting connection" between the main stirrup 4 and the support bar 6. Of course, without departing from the scope of the invention, the latter may also be applied to the pivoting connection between the support bar 6 and the auxiliary support bar 9. Referring now to FIGS. 2 and 3, these Figures show the cross sectional profile of the stirrup 4, generally in the form of an inverted U-shaped channel the wings 12 of which join the central web or back 13 of the U at right angles. In the vicinity of the end 5 of the stirrup 4, an opening 14, generally rectangular in shape, is formed through the back 13 of the U. One of the small sides 15 of the opening 14 is spaced away from the extreme edge 16 of the end portion 5 of the main stirrup, while the larger sides 17 of the opening are situated substantially beyond the inner face of the back 13, this inner face being considered within the U-shaped channel defined by the main stirrup 4. A lower opening 19 is provided in each free end 18 of the wings 12. This lower opening 19 is generally rectangular in shape, with one of its larger sides coincident with the free end 18, and with one of its smaller sides at the same level as the smaller side 15 of the rectangular opening 14 described above.

Figure 4:
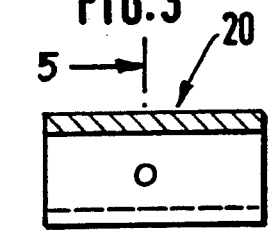
FIG. 4 shows a partial view of another element of the pivoting connection device in accordance with the invention.
Figure 5:
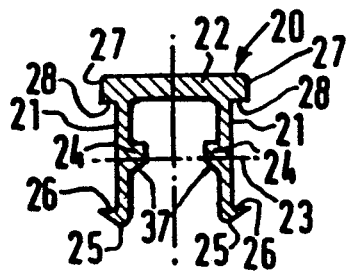
FIG. 5 is a view in cross section taken on the line 5—5 in FIG. 4.

The opening 14 and the opening 19 are adapted to receive an intermediate member 20, which will typically be made in plastics material. The intermediate member 20, as is best seen in FIGS. 4 and 5, generally has a U-shaped channel section having two wings 21 which are parallel to each other and which join a central web 22 at right angles. In the interior of the channel defined by the member 20, the wings 21 define an axis of rotation 23. In practice this axis is defined by two projections or pivot pins 24, each extending from the inner face of a respective one of the wings 21, and being aligned with each other.

Each of the wings 21 carries in the region of its free end a protuberance or detent 25, which projects outwardly of the U-shaped channel and which has a straight surface 26 substantially parallel to the axis of rotation 23. The central web 22 extends in a direction at right angles to the longitudinal direction of the wings 21, by way of extension portions 27. The outer edge of each extension portion 27 is coincident with the upper surface of the central web 22. The lower surface 28 of the extension portions 27 lies at substantially the same level as the inner surface of the central web 22.

The intermediate member 20 is arranged to be carried in the free end portion 5 of the main stirrup 4, over a length which is substantially equal to the length of the opening 14, while the external distance between the wings 21 of the member 20 is at least equal to the internal distance between the two wings 12 of the U-shaped channel defined by the main stirrup 4. Similarly, the distance between the straight surface 26 and the lower surface 28 is substantially equal to the distance between the larger side of the opening 14, over the wings 12, and the larger side of the opening 19 defined is situated on the other side of the wings.

Figure 6:
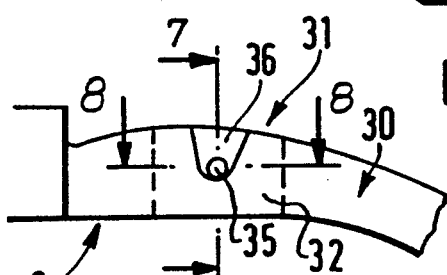
FIG. 6 is a partial view showing another element of the pivoting connection device in accordance with the invention.
Figure 7:
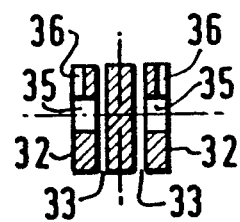
FIG. 7 is a view in cross section taken on the line 7—7 in FIG. 6.
Figure 8:
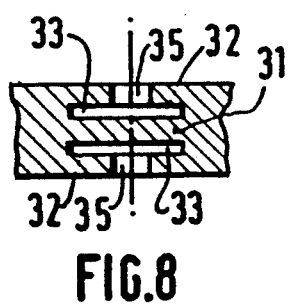
FIG. 8 is a view in cross section taken on the line 8—8 in FIG. 6.

Referring now to FIGS. 6 to 8, the support bar 6 is arranged to be carried pivotally in the main stirrup 4, and comprises a body 30 which carries a pivot member 31. The pivot member 31, as is best seen in FIGS. 7 and 8, comprises two resilient plate elements 32 which result from the formation of two rectangular slots 33 parallel to each other and spaced from each other. These slots are formed in the body 30 on either side of the core 34 of the latter.

These slots 33 may of course be so dimensioned that they join each other in such a way as to define only one single central opening, the core 34 of the body 30 then being absent. Each of the resilient plate elements 32 has a hole 35 which extends through it, to open out in the associated rectangular slot 33. In addition, each resilient plate element 32 has a guide groove 36, which is substantially triangular in shape. The base of this triangle lies at the level of the face of the main body 30 of the support bar which is arranged to cooperate with the main stirrup 4. The apex of the triangle is substantially coincident with the hole 35.

Fitting of the various components of the pivoting connection will now be explained with reference to FIGS. 9 to 12. In a first step, which can be seen from FIG. 9, the intermediate member 20 is fitted in the opening 14 and the openings 19. This is done by offering up the intermediate member 20 in a vertical movement which corresponds substantially to the direction X, X' indicated in FIG. 9, in line with the opening 14, bringing the protuberances 25 into cooperation with this opening.

As this movement is continued, the protuberances 25 slide on the wings 12 of the U-shaped channel of the main stirrup 4, so deforming the wings 21 of the intermediate member 20 that they move closer to each other, so as to enable the wings 21 to be introduced along the internal surfaces of the wings 12, through the engagement of the outer edge of the protuberances 25 on these internal surfaces.

Figure 10:
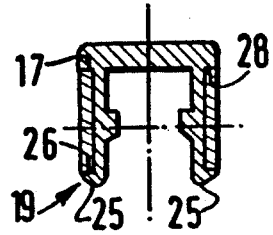

At the end of the movement described above, the state is reached which is shown in FIG. 10. Here the straight surfaces 26 of the protuberances 25 lie in contact with the larger sides of the lower openings 19, while the lower surfaces 28 of the extension portions 27 lie in contact with the larger sides 17 of the opening 14. The intermediate member 20 is thus immobilised in a vertical direction by cooperation of the various surfaces described above. It is also immobilised in a longitudinal direction through the cooperation of the smaller sides 15 of the rectangular opening 14 and of the openings 19 with the longitudinal edges of the intermediate member 20.

Figure 11:
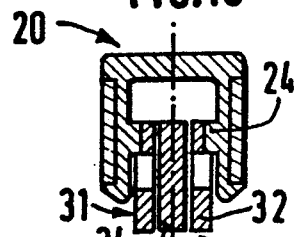
Figure 12:
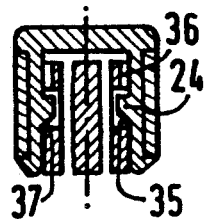

In a second stage of the assembly operation, the support bar 6 is offered into the interior of the U-shaped channel, seen in FIG. 10, which is now defined by the assembly of the intermediate member 20 with the end of the main stirrup 4. As is best seen in FIGS. 11 and 12, the support bar 6 is presented straight into the open side of this channel. The pivot member 31, and more particularly the guide groove 36, are offered up in alignment with the projections 24 of the intermediate member 20. Through their cooperation with these projections, the resilient plate elements 32 are then urged towards the core 34 of the body 30 so as to enable the body 30 to pass into the U-shaped channel.

As can be seen most clearly from FIG. 12, during the insertion movement of the support bar 6, the projections 24 slide in the grooves 36 until they come into cooperation with the holes 35 of the resilient plate elements 32, so that the tension is then released in the latter after the projections 24 have entered the holes 35. The support bar 6 is then pivoted on the intermediate member 20 while the plate elements 32 bear on the internal surfaces of the wings 21 of the member 20.

In practice, in order to facilitate the introduction of the support bar 6, the projections 24 may be formed, on their sides facing the open side of the U-shaped channel seen in FIG. 10, with two inclined portions 37 in the vicinity of their free ends. The present invention is not limited to the embodiments described, but embraces any variant. In particular, the holes 35, shown in FIG. 7 facing each other in the plate elements 32, may comprise a hole formed through not only the plate elements 32 but also through the core 34 of the body 30 of the support bar 6: this tends to facilitate the assembly of the support bar 6.

Again the projections 24 may be carried by the resilient plate elements 32, with the holes with which they cooperate being carried by the wings 21 of the U-shaped channel defined by the intermediate member 20.

What is claimed is:

1. A windshield wiper blade comprising a channel-shaped main stirrup (4) having surfaces of a general cross section in the form of an inverted U, said main stirrup having a substantially rectangular opening (14, 19) in an end portion thereof and being adapted for oscillation, a support bar (6) pivotally mounted to said end portion (5) of said main stirrup by means of an insertable pivoted connection (20, 31), a wiping strip (2) supported by said support bar, said insertable pivoted connection comprising a U-shaped intermediate member (20) having a central web (22) and depending side wings (21), said side wings having outwardly extending detents (25) on end portions thereof, a pair of pivot pins (24) projecting from said side wings in facing relationship, said intermediate member being insertable in said rectangular opening and being secured therein by said detents, said support bar having two resilient plate elements (32) integral therewith, a pair of opposed holes (35) in said plate elements, said plate elements insertable in said U-shaped intermediate member whereby said plate elements are resiliently biased to receive said pivot pins.

2. A windshield wiper blade according to claim 1, wherein the resilient plate elements have guide grooves.

3. A windshield wiper blade according to claim 1 wherein said resilient plate elements are formed in said support bar by at least one slot (33).

4. A windshield wiper blade according to claim 3 wherein said resilient plate elements are formed in said support bar by two spaced slots (33) defining a core element (34).

5. A windshield wiper blade according to claim 1 wherein said pivot pins have inclined portions (37) to facilitate reception of the pivot pins (24) in the holes (35).

6. A windshield wiper blade according to claim 1 with said support bar (6) having first (7) and second (8) ends and said support bar being pivotally mounted between said first and second ends to said main stirrup.

7. A windshield wiper blade according to claim 6 including an auxiliary support bar (9), said auxiliary support bar being pivotally mounted to said second end (8) of said support bar (6).

8. A windshield wiper blade according to claim 1 wherein said opening (14, 19) is rectangular in shape and undercut with respect to the surfaces of said main stirrup to receive said intermediate member thereby preventing lateral movement of said intermediate member.

* * * * *